UNITED STATES PATENT OFFICE.

ADOLPHE SEIGLE, OF LYON, FRANCE.

PROCESS OF EXTRACTING GOLD, PLATINUM, SILVER, NICKEL, COPPER, &c.

No. 915,705.      Specification of Letters Patent.      Patented March 16, 1909.

Application filed February 6, 1906. Serial No. 299,778.

*To all whom it may concern:*

Be it known that I, ADOLPHE SEIGLE, a citizen of France, residing at Lyon, Rhône, France, have invented new and useful Improvements in New (Wet) Processes for the Extraction of Gold, Platinum, Silver, Nickel, Copper, &c., of which the following is a specification.

The industry for the extraction of metals by chemical processes properly so called or wet processes has for some years past been one of the most important branches in the metallurgy of certain metals more or less precious.

My invention has for its object an improvement in the said ways of industrial extraction, particularly for gold, platinum, silver, nickel and copper. It is clearly characterized by a new use to which, with a view to arrive at the separation of the said metals, I put the special, and in some sort occasional, affinities for certain oxids that silicic acid or its analogue boric acid, acquires under the determining influence of water steam under sufficient pressure during a suitable time. In any case, the said chemical affinities or preferences are so much the more rapid and energetic as the steam is higher in pressure and temperature, and as, on the other hand, the raw materials are more intimately kneaded in an autoclave in presence of steam.

The oxids I am alluding to, are those called alkaline bases, earthy-alkaline bases, earthy bases and some metallic oxids properly so called, such as protoxid of iron. Consequently I choose salts able, on the one hand, to contribute by certain reactions *ad hoc* to the formation of certain silicates or borates based upon one or several of the above mentioned oxids, under the action of steam pressure and, on the other hand, to abandon *ipso facto* one or more chemical elements which by their adjunction to the metals to be extracted contribute to the formation of salts soluble in water or in certain industrial lixivia. For the rest of the extracting operations, I employ the ways generally used for precipitating to the metallic state or separating electrically or otherwise the said metals from their chlorid, bromid, cyanid, or other combinations.

With a view to explain the principle, the ways of carrying out and the industrial advantages of my invention, I shall, as simple examples, state briefly some of the uses to which it can be put. Suppose first that I have to extract both copper and nickel from one of their common ores, say a very silicious and rather poor ore. As in other wet processes I begin by grilling the ore, unless the copper and nickel are not in the state of carbonates, sulfurets or arsenites. In any case, it is necessary to grind the ore into a somewhat fine powder, and if it has not a sufficient percentage of silica, to mix carefully with it some quartz sand or any other finely divided silicious material. The silicious mixture is then put in an autoclave (a sort of boiler) fitted with mixing paddles which continue the kneading of the powdered materials while the same are moistened by any suitable apparatus with a weak solution of one or several of the calcium, sodium, magnesium, barium, strontium, or iron chlorids.

I habitually use solutions of calcium and magnesium which are a by-product of the manufacture of soda made by the ammonia process and also of the manufacture of potassium salts in the inexhaustible deposits of double potassium and magnesium chlorids in Stassfurth (Germany). To this I add a small quantity of protochlorid of iron. Of course, the solution used must be more or less rich in chlorids, first it must be in a suitable proportion to the percentage of the metal to be dissolved, and second it must be taken into account that, in spite of the double action of the silica and pressure-steam, the magnesium, calcium and iron chlorids give off their chlorin only to a partial extent.

When the powder of silicious ore and the chlorid solution form a fluid paste perfectly mixed, I introduce steam into the autoclave gradually attaining a pressure of 3 kilos (42 lbs. 6 ozs. per square inch) or much more if the autoclave is strong enough and maintaining such maximum pressure for some hours, or for a whole day if necessary. According as the steam pressure is more or less high, there are produced in the paste in the autoclave certain chemical reactions giving rise to molecular displacement and exchanges in the various chemical compounds intimately mixed. Finally, there is chiefly a formation of compound insoluble silicates of magnesium, calcium, iron, etc., in consequence of the peculiar action, as above explained, of the silica in presence of steam under pressure, while, on the other hand, there is a formation of chlorids (more or less soluble and complex) of copper and nickel, as both these metals, under the general conditions of the operation in question have a far greater affinity for chlorin than for silicic acid; whereas it is different in the case of iron, calcium and magnesium.

Here I may point out that one of the important results of this specialization, occasional, if I may so call it, of the chemical affinities, gives room for obtaining, even with ores containing iron in the state of silicate, like "Garnierite" chlorids of nickel and copper void of iron and this by a very simple chemical operation and without complicated apparatus. The apparatus would last the longer owing to the absence of free acids, or corrosive or dangerous gases, which on the contrary are inevitably used or produced in other processes of extraction. In this connection I may add that with regard to the application of my invention to the treatment of gold or silver ores of which I shall give an example later, the working advantages and chiefly the suppression of using any corrosive or dangerous elements are still more important, principally when there is a question of cyanid solutions.

To complete my explanation relating to the obtaining of soluble salts of copper and nickel, it is almost needless to add that if we intend to insure the total extraction of metals we must, as in other processes of extraction, make successive operations. With this object, the autoclave may be fitted at the bottom with a partition or even a screen to make way for the chlorid solution; this solution being then carried by a pump to the upper part of the autoclave, whence it is poured again upon the paste which is continually kneaded by the mixing paddles. It might be sufficient to produce in the autoclave the chlorids and even the oxychlorids of nickel and copper, and afterward to wash the paste, when the same is out of the autoclave. In such a case it would be best to mold the mixture of silicious ore and chlorids previously into the form of egg-shaped balls, or any other suitable form; these balls would be put in the autoclave. After they would have sufficiently undergone the action of steam, these balls would be taken out from the autoclave, then ground into powder and finally washed with suitable solutions.

In the case where ores still contain sulfurets in spite of their previous calcination, it would be necessary to add to the solution of calcium, magnesium, etc., chlorid, a small quantity of perchlorid of iron. In such a case the reactions would be a little more complex; first the perchlorid of iron acting upon the sulfurets of copper and nickel will transform them into basic chlorids and the perchlorid of iron itself will become protochlorid of iron which, as explained above, will be in its turn transformed into ferrous silicate. In the case where the ore to be treated contains silver gold and some platinum, it would be convenient to extract first copper, nickel and even silver operating as has been explained, but taking care to add a sufficient quantity of sodium chlorid to the washing solutions for the purpose of dissolving the silver chlorid. Afterward the ores will be treated for extracting gold and platinum according to either of the ways that I am about to explain for extraction of gold and platinum from their alluvial ores such as the auriferous sands of the Transvaal. If the ores or sands are fairly rich in gold or platinum it will be sufficient to add some nitrate of soda or certain other nitrates to the solution of calcium, magnesium, and iron chlorids used for moistening the ore in the autoclave, and to operate as has been explained for dissolving copper and nickel.

Under the double action of the silicic acid of sand and steam under as high a pressure as possible, the above chlorids and nitrates are fairly well decomposed and gold and platinum are easily dissolved in the sort of *aqua regia* thus formed. Besides, it must be noted that the dissolving elements act in the "nascent state" which, as every one knows, makes their action more energetic and finally more economic. Moreover this remark upon the nascent "state" has the same importance for all the applications of my invention.

With regard to poor auriferous sands, or certain auriferous deposits, it is better to use the cyanid process. In such a case there is a special way of using my invention.

For securing all the advantages brought in this case by the double action of silicic acid and high pressure steam it is necessary not to use the cyanid usually employed, viz. the potassium cyanid, which is a chemical compound somewhat unstable, very expensive and very dangerous. Indeed, with my process it is possible to use very practically and very economically the product commonly employed in dyeing works called yellow prussiate or potassium ferrocyanid. This is a well known double cyanid of potassium and iron in which (under the combined action of silica and high pressure steam) one equivalent of gold replaces its equivalent of iron. This combined action being continued, gold can also replace at least one of the equivalents of potassium. We introduce air into the autoclave, so that the oxygen may act as in the usual cyanid process. Further, I may use the various accessory methods already in use for helping the reactions or lessening the losses of reacting substances, for instance, by previously adding ground lime to the auriferous materials. Finally, after full reaction has taken place between the auriferous sand or the precipitate and the yellow prussiate thoroughly kneaded together and submitted in an autoclave to steam under pressure, there will have been formed on the one hand a double silicate of potash and protoxid of iron, and on the other hand, a double cyanid of potassium and gold.

Yellow prussiate being, as a matter of fact, very stable in comparison with the simple cyanids which are so liable to alteration, such as the potassium cyanid generally used in the Transvaal and elsewhere, the result is a great decrease in the expense of extraction, so much the more as with my process the cyanization of gold is made in the hot state, which is impossible with the potassium cyanid of which the solutions are more or less decomposed at their boiling temperature.

As everybody knows, dissolving actions and chemical transformations are strongly assisted by raising the temperature and the characteristic influence exerted by high pressure steam must not be forgotten.

Having described my invention as above and reserving to myself the right to modify the circumstances and accessories which may contribute toward its realization in a more or less simplified or improved measure, I claim as being my exclusive property:—

A process of extracting copper, gold, silver, platinum and nickel from ores, tailings and other residues or wastes, consisting in roasting the metal bearing material, reducing it to a pulverized state, mixing it with finely divided silicious material, working up the mixture with a chlorid solution, subjecting it to the action of steam under pressure, and finally washing the resultant product to extract the chlorids of the metals.

In testimony whereof I have signed my name to this specification in the presence of two subscribing witnesses.

ADOLPHE SEIGLE.

Witnesses:
   THOS. N. BROWNE,
   GASTON JEAUNIAUV